US006545844B1

(12) United States Patent
Schaenzer et al.

(10) Patent No.: US 6,545,844 B1
(45) Date of Patent: Apr. 8, 2003

(54) CLOCK HEAD WITH SPACER

(75) Inventors: Mark James Schaenzer, Eagan, MN (US); Stephen John Miller, Fridley, MN (US); Gordon Merle Jones, Egan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/677,123

(22) Filed: Sep. 29, 2000

Related U.S. Application Data
(60) Provisional application No. 60/160,416, filed on Oct. 19, 1999.

(51) Int. Cl.[7] .............................................. G11B 21/16
(52) U.S. Cl. ..................................................... 360/245.4
(58) Field of Search ........................... 360/245.4, 245.3, 360/244, 246.4, 245.1

(56) References Cited

U.S. PATENT DOCUMENTS

| | | | |
|---|---|---|---|
| 4,107,746 A | 8/1978 | Conway | 360/78 |
| 4,157,577 A | 6/1979 | Porter, Jr. et al. | 360/77 |
| 4,399,476 A * | 8/1983 | King | 360/245.1 |
| 4,587,579 A | 5/1986 | Cocke et al. | 360/75 |
| 4,807,070 A | 2/1989 | Isozaki et al. | 360/104 |
| 4,884,623 A * | 12/1989 | Suzuki et al. | 164/129 |
| 4,920,442 A | 4/1990 | Dimmick | 360/137 |
| 5,448,429 A | 9/1995 | Cribbs et al. | 360/75 |
| 5,485,322 A * | 1/1996 | Chainer et al. | 360/51 |
| 5,541,784 A | 7/1996 | Cribbs et al. | 360/75 |
| 5,583,712 A | 12/1996 | Brunelle | 360/77.07 |
| 5,659,448 A * | 8/1997 | Shimizu et al. | 360/245.1 |
| 5,668,679 A | 9/1997 | Swearingen et al. | 360/75 |
| 5,719,726 A | 2/1998 | Hayakawa | 360/104 |
| 5,774,305 A | 6/1998 | Boutaghou | 360/104 |
| 5,781,379 A | 7/1998 | Erpelding et al. | 360/104 |
| 5,828,510 A | 10/1998 | Yada et al. | 360/51 |
| 5,875,071 A | 2/1999 | Erpelding et al. | 360/104 |
| 5,880,908 A | 3/1999 | Shiraishi et al. | 360/104 |
| 5,907,457 A | 5/1999 | Kudo et al. | 360/103 |
| 6,344,942 B1 * | 2/2002 | Yamchuk | 360/75 |
| 6,388,833 B1 * | 5/2002 | Golowka et al. | 360/51 |

FOREIGN PATENT DOCUMENTS

JP            10011929      *   1/1998

* cited by examiner

*Primary Examiner*—David Hudspeth
*Assistant Examiner*—Angel Castro
(74) *Attorney, Agent, or Firm*—Joseph R. Kelly; Westman, Champlin & Kelly, P.A.

(57) ABSTRACT

A clock head assembly intended for vertical engagement to a disc in a disc drive for purposes of providing an arrangement of precise timing marks on the disc for use by a servo-writer. The clock head assembly includes a slider of the 50% or 30% size and a spacer adhesively attached to the upper surface thereof. In order to minimize stresses induced in the slider by the adhesive bonding, and to ensure that the clock head is capable of correct flying performance relative to the disc, the present invention envisions that the spacer surface bonded to the slider, or slider bonding surface, has dimensions substantially half the size of the dimensions of the surface of the slider to which the spacer is bonded. In another aspect of the invention, the spacer is designed to be suitable for large batch production. In another aspect of the invention, the spacer includes, adjacent the surface opposite the slider bonding surface, an overhanging rim portion, which acts not only as a readily optimized surface for bonding the spacer/slider assembly to the head suspension of the clock head assembly, but also as a visual aid to correctly orient the spacer relative to the slider during bonding of the two together.

5 Claims, 7 Drawing Sheets

CLOCK HEAD WITH SPACER

CROSS REFERENCE TO RELATED APPLICATION

This application claims the benefit of U.S. Provisional Application Ser. No. 60/160,416, filed Oct. 19, 1999.

BACKGROUND OF THE INVENTION

This application relates generally to the field of rigid magnetic disc drive data storage devices, and more particularly, by not by way of limitation, to a clock head which facilitates writing of servo information on rigid discs in a disc drive.

Disc drives of the type known as "Winchester" disc drives or rigid disc drives are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

The movement of the heads across the disc surfaces in disc drives utilizing voice coil actuator systems is typically under the control of closed loop servo systems. In a closed loop servo system, specific data patterns used to define the location of the heads relative to the disc surface are prerecorded on the discs during the disc drive manufacturing process. The servo system reads the previously recorded servo information from the servo portion of the discs, compares the actual position of the actuator over the disc surface to a desired position and generates a position error signal (PES) reflective of the difference between the actual and desired positions. The servo system then generates a position correction signal which is used to select the polarity and amplitude of current applied to the coil of the voice coil actuator to bring the actuator to the desired position. When the actuator is at the desired position, no PES is generated, and no current is applied to the coil. Any subsequent tendency of the actuator to move from the desired position is countered by the detection of a position error, and the generation of the appropriate position correction signal to the coil.

Servo information is typically recorded on the discs in late stages of the manufacturing process, i.e., after the disc stack and head assemblies have been completely assembled in the drive. Since, at the time of servo-writing, there is no information on the discs themselves with which to control movement of the actuator—as described above—servo writing is typically accomplished using sophisticated machines called servo-writers.

In order to assure that the servo information is accurately recorded on the discs—and in order to enable highly accurate positioning of the head assemblies in the finished disc drive—it is essential that the recorded servo information being recorded is closely synchronized with the rotational speed of the spindle motor.

Servo-writers typically include some type of registration and clamping system to accurately position the entire disc drive within the servo-writer, and maintain the drive being servo written in a fixed location throughout the servo writing process. Once the drive is locked in position, it is powered up and a clock head is engaged to the layer of air dragged along by one of the disc surfaces—typically the uppermost disc in the disc stack—near its outermost periphery. The rotational speed of the spindle motor is tested, and information from this testing is used to apply a highly precise series of timing marks to the disc. These timing marks are used by the servo-writer to synchronize the servo data to be written with the rotational speed of the disc.

Once the clock head has completed writing the timing marks, the servo-writer proceeds to record the position control information on the discs. This position control information may be in the form of "dedicated" servo information, all written to a single surface of the disc stack set aside for this purpose, or "embedded" servo information, which is recorded at specific intervals between those areas of the discs allocated for recording user data.

Whatever type of servo information is being recorded, the actuator of the disc drive cannot itself control movement of the head assemblies from track to track during servo writing, since the tracks do not exist until completion of servo writing. Therefore, it is common for the servo-writer to also include a highly precise servo actuator, which is mechanically coupled—usually through an opening in the disc drive housing—to the disc drive actuator, to control head movement during the servo writing process.

Once servo writing is complete, any openings used by the servo-writer are sealed, and the disc drive is in condition for initial self-testing.

Servo-writers have assumed many forms. For example, one type of servo-writer was used before the top cover of the disc drive assembly was attached. While this type of servo-writer had simple access to the disc drive actuator and discs, it also had to be utilized in a "clean room" environment, creating extra costs for manufacturing equipment, as well as stringent cleanliness demands on manufacturing personnel.

Furthermore, most disc drives currently being manufactured secure both the tops and bottoms of the spindle motor and actuator pivot shaft to the disc housing, i.e., to both the disc drive base plate, and the disc drive top cover. Without the top cover secured in place, it is problematic to maintain the desired relationship between the actuator and disc stack, and, therefore, such "open drive" servo-writers have fallen out of use.

A second type of servo-writer, described in U.S. Pat. No. 5,760,989, issued Jun. 2, 1998, to Colban, assigned to Phase Metrics of San Diego, Calif., inserted a clock head through a cooperative opening in the lateral side wall of a disc drive.

The clock head assembly of Colban was precisely clamped to the disc drive after the disc was mounted to a plate member having alignment and clamping features. The clock head assembly included a manually operated camming system for lifting and lowering the clock head assembly. In operation, the person utilizing the invention had to ensure that the camming system was maintaining the clock head in the "up" position, manually insert the clock head through the opening in the disc drive housing, and align the assembly with appropriate features provided on the plate to which the disc drive itself was clamped, always being careful to avoid damaging contact between the clock head and the disc during such alignment and clamping. Only after the alignment and clamping were complete could the clock head be manually lowered into cooperative engagement with the disc.

Furthermore, the very nature of the clock head assembly of Colban necessitated a significant amount of vertical space between the uppermost disc in a disc stack and the top cover, since the clock head had to be inserted in a raised condition, and could only be loaded into engagement with the disc when such insertion was complete. With the continuing industry demand for ever smaller disc drive form factors, manufacturers are understandably reluctant to provide vertical space within the disc drive envelope for clock head raising and lowering, especially since such vertical space would be of no positive use during normal operational conditions of the disc drive.

It has, therefore, become common to engage the disc drive with a clock head by providing an opening in the top cover of the disc drive, which will allow the clock head to be horizontally aligned with the desired location relative to the disc before it is lowered into engagement with the disc. Thus, any vertical excursion which the clock head must undergo for servo writing is unrelated to the relative spacing between the uppermost disc in the disc drive and the top cover, allowing smaller physical packages for disc drives, or, alternatively additional discs and heads to be employed within a defined standard housing size.

Vertical insertion of the clock head through an opening in the top cover has, however, required that a spacer be provided between the head suspension used to mount the clock head and the clock head itself. This spacer is typically adhesively bonded to the upper surface of the clock head slider on one side, and to the gimbal assembly of the head suspension on the other.

Clock heads of the well known "mini-Winchester" format were sufficiently robust to withstand stresses generated by such adhesive bonding, without adverse effects on the flying characteristics of the clock head. However, with the advent of the so-called "70%" slider—with orthogonal dimensions only 70% those of the mini-Winchester slider—and the even smaller "50%" and "30%" sliders commonly in use today, stress induced on the slider by the adhesive bonding to a spacer has become a concern.

The present invention is directed to providing a clock head assembly, suitable for vertical engagement with a disc in a disc drive, which includes a spacer which is optimized to reduce stresses induced in the clock head slider from the adhesive bonding of the spacer between the slider and the head suspension, and thus ensure that proper flying of the clock head is not detrimentally impacted by the presence of the spacer.

SUMMARY OF THE INVENTION

The present invention is a clock head assembly intended for vertical engagement to a disc in a disc drive for purposes of providing an arrangement of precise timing marks on the disc for use by a servo-writer. The clock head assembly includes a slider of the 50% or 30% size and a spacer adhesively attached to the upper surface thereof. In order to minimize stresses induced in the slider by the adhesive bonding, and to ensure that the clock head is capable of correct flying performance relative to the disc, the present invention envisions that the spacer surface bonded to the slider, or slider bonding surface, has dimensions substantially half the size of the dimensions of the surface of the slider to which the spacer is bonded. In another aspect of the invention, the spacer is designed to be suitable for large batch production. In another aspect of the invention, the spacer includes, adjacent the surface opposite the slider bonding surface, an overhanging rim portion, which acts not only as a readily optimized surface for bonding the spacer/slider assembly to the head suspension of the clock head assembly, but also as a visual aid to correctly orient the spacer relative to the slider during bonding of the two together.

The manner in which the present invention is implemented, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
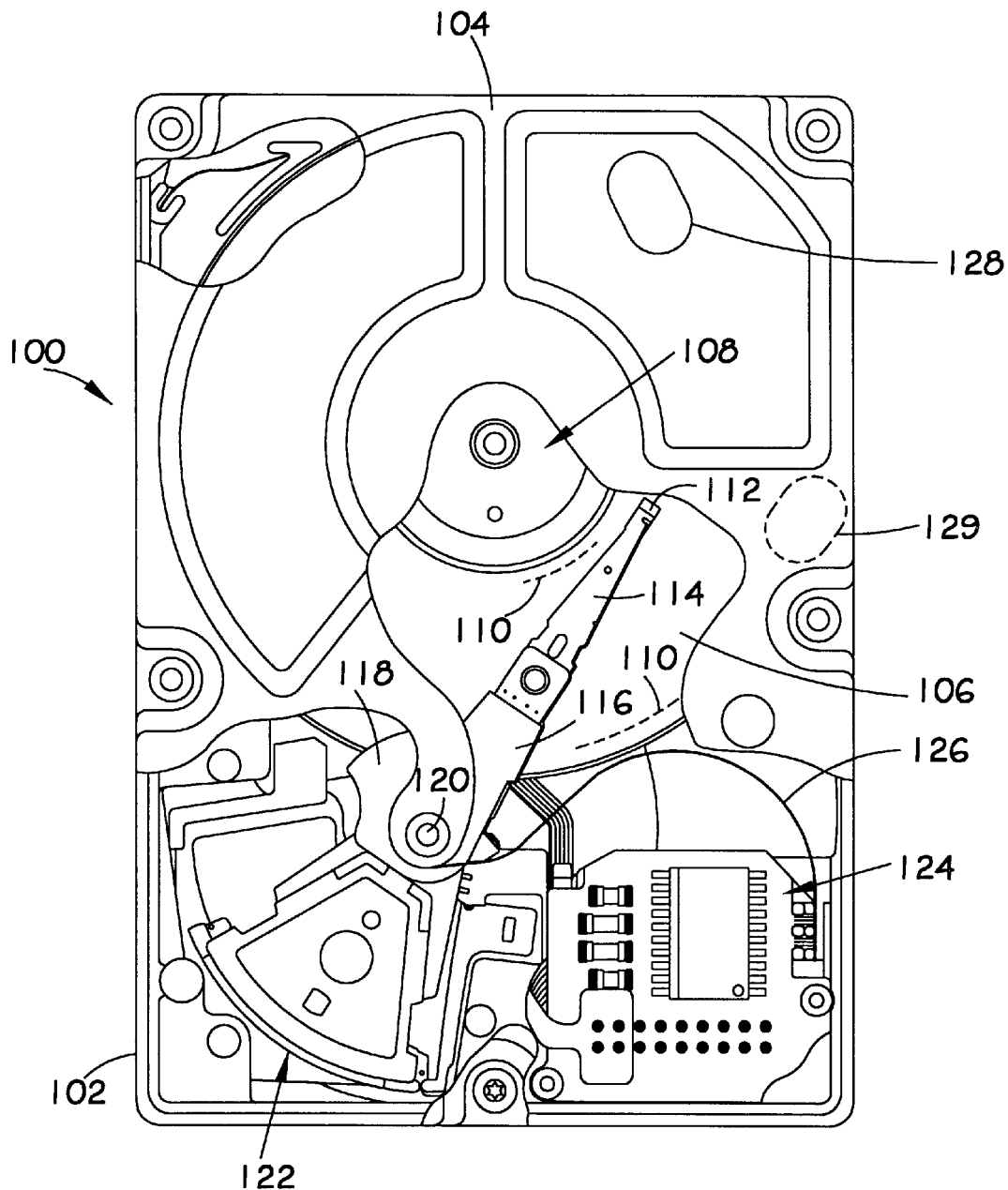
FIG. 1 is a top plan view of a disc drive with which the present invention is particularly useful.

Turning now to the drawings and specifically to FIG. 1, shown is a plan view of a disc drive 100 with which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It will be understood by those of skill in the art that proper operation of the disc drive 100 is dependent upon there being accurately recorded servo positioning information on the discs 106. This is especially true for the coming generation of disc drive products, in which track densities are expected to approach 50,000 tracks per inch (tpi). Similarly, the recording of highly accurate servo positioning information on the discs 106 requires an extremely accurate clock head assembly, to time the writing of the servo information.

Figure 2:
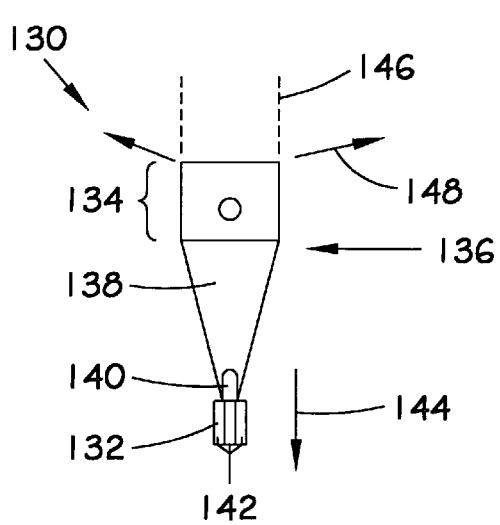
FIG. 2 is a bottom plan view of a typical prior art "in-line" head/head suspension assembly, useful for identifying common elements of a head/head suspension assembly.

Turning now to FIG. 2, shown is plan view of a typical prior art "in-line" head/head suspension assembly 130.

The head/head suspension assembly 130 includes a head assembly 132 and a head suspension (not generally designated) that consists of several functional portions common to a typical head suspension: 1) a mounting portion 134, which commonly includes a robust mounting plate (not separately designated) for providing a strong mounting apparatus for the entire head/head suspension assembly 130; 2) a spring portion, shown generally at 136, for generating a load force, directed toward the disc surface, for counterbalancing the hydrodynamic lifting tendency of the head assembly 132; 3) a rigid beam portion 138, for transferring the load force generated by the spring portion 136; and 4) a gimbal portion, for attachment to the head assembly 132, which allows compliance of the head assembly 132 in the roll and pitch axes of the head assembly 132, and provides stiffness in the yaw and in-plane axes.

FIG. 2 also shows that the head assembly 132 includes a pair of parallel air bearing surfaces (ABS) 142, which extend generally in line parallel with the longitudinal axis of the entire assembly and which is the reason for the assembly being referred to as "in-line". The ABS 142 are also, of necessity, substantially in parallel with the direction of disc motion relative to the head assembly 132, as represented by arrow 144.

In-line head/head suspension assemblies 130 are used with rotary actuators, such as that described in relationship to FIG. 1 above. That is, the mounting portion 134 is fixedly mounted to an actuator head mounting arm (116 in FIG. 1) as shown by dashed lines at 146 in the figure. The head mounting arm 146 extends to become part of the actuator body (118 in FIG. 1) which pivots about the pivot shaft (120 in FIG. 1) to move the head/head suspension assembly 130 in an arcuate motion, as represented by arrows 148 in FIG. 2. The clock head of the present invention, as will be described below, is typically mounted to a head suspension having the same general function portions as those described above. However, most clock heads, including the embodiment to be described below, are not of the "in-line" type, shown in FIG. 2.

Figure 3:
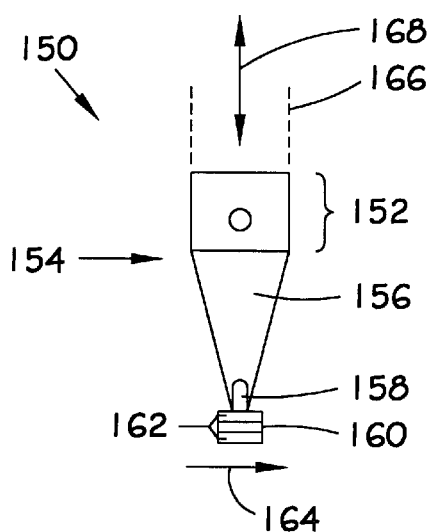
FIG. 3 is a bottom plan view of a typical prior art "transverse" head/head suspension assembly.

FIG. 3 shows a plan view of a typical prior art "transverse" head/head suspension assembly 150, with the head suspension (not generally designated) comprising a mounting portion 152, a spring portion, generally designated by arrow 154, a rigid beam portion 156 and a gimbal portion 158, all serving substantially the same functions described above for comparable elements of FIG. 2.

The head assembly 160 of FIG. 3, however, can be seen to be oriented relative to the head suspension such that its ABS 162 extend transverse to the longitudinal axis of the head suspension, leading to the "transverse" designation for the overall assembly. Once again, however, it should be noted that the ABS 162 are substantially parallel with the direction of disc rotation, as indicated by arrow 164.

As will be apparent to those of skill in the art, transverse head/head suspension assemblies, such as the assembly 150 of FIG. 3, are not suited for use with rotary actuators. Instead, even though the head/head suspension assembly 150 is commonly attached to an actuator head mounting arm, as shown by dashed lines at 166, the actuator head mounting arm 166 would be part of a linear actuator, which moves the entire head/head suspension assembly 150 back and forth in the direction of arrow 168 and substantially along a radius of the disc to traverse from track to track.

The clock head assembly of the present invention is constructed similarly to the transverse head/head suspension assembly 150 of FIG. 3, with the inclusion of a spacer between the gimbal portion 158 of the head suspension and the head assembly 160, as will be described in more detail below.

Figure 4:
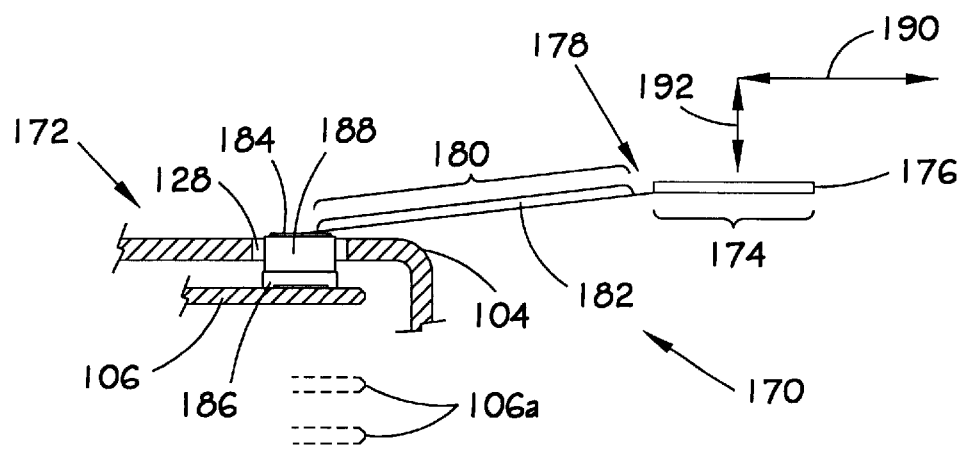
FIG. 4 is a side elevation view, partially in section, of a prior art clock head assembly in cooperative engagement with a disc drive, and showing various component relationships.

FIG. 4 is a side elevation view of a typical prior art clock head/head suspension assembly 170, shown in cooperative engagement with relevant portions of a disc drive 172, shown in section. The disc drive 172 is similar to the disc drive 100 of FIG. 1.

In FIG. 4, the head suspension (not designated) can be seen to be made up of a mounting portion 174 which includes a relatively thick and robust mounting plate 176. The mounting plate 176 typically includes some mechanism, such as a swaging feature (not shown), for attaching the mounting plate 176 to an actuator head mounting arm, as was described in relationship to FIGS. 1 and 3.

The spring portion 178 of the head suspension can be seen to consist of a bend in the material of the head suspension, which acts as a cantilevered spring to provide the load force which will be applied through the rigid beam portion 180. The rigid beam portion 180 includes side rails 182 folded out of plane to increase the stiffness of the rigid beam portion 180, in a manner well known in the art.

The load force generated by the spring portion 178 is passed by the rigid beam portion 180 to the gimbal portion 184, whence it is applied to the clock head 186 through a spacer 188. The spacer 188 is necessary to provide additional vertical height between the slider body of the clock head 186 and the head suspension elements, since, as shown in the figure, the clock head 186 is placed into cooperative engagement with a disc 106 by lowering the clock head 186 through a hole 128 in the top cover 104 of the disc drive 172. The location of additional discs in the disc stack are shown with dashed lines at 106a.

In order for the clock head 186 to be engaged with the disc 106, the entire clock head/head suspension assembly must be mounted on some sort of actuator (not shown) which first translates leftward along the path shown by arrow 190, and is then lowered along the path of arrow 192. After the desired timing marks are written on the disc 106, the clock head 186 can be removed from engagement with the disc 106 by moving the actuator upward along the path of arrow 192, and then to the right along the path of arrow 190.

FIG. 4 also shows, as mentioned previously, that engaging the clock head 186 with a disc 106 through a hole 128 in the top cover 104 allows the top cover 104 to lie more closely adjacent the top disc 106 in the disc stack than would be possible if the clock head were to be inserted from the side of the disc drive 172, necessitating lifting and lowering the clock head 186 within the disc drive housing.

Figure 5:
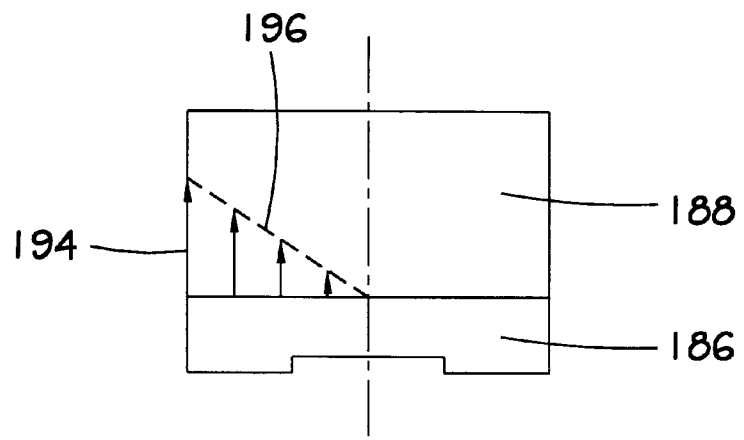
FIG. 5 is simplified elevation view of a prior art clock head assembly, including a slider and a spacer adhesively bonded thereto, useful for a rudimentary discussion of the stresses induced on the slider by adhesive bonding to the spacer.

FIG. 5 is a simplified elevation view of a typical prior art clock head/spacer assembly 186/188, such as that shown in FIG. 4, and illustrates one of the disadvantages of such assemblies.

It can be seen in the figure that the prior art spacer 188 is bonded to the clock head 186 over substantially the entire upper surface of the clock head 186, and that the spacer 188 is much thicker than the clock head, making the spacer 188 a much more rigid element than the clock head 186. When the clock head 186 and spacer 188 are adhesively bonded together, shrinkage of the bonding agent induces stress between the clock head 186 and the spacer 188, and, since the spacer 188 is stiffer than the clock head 186, this stress can cause distortion of the clock head 186, potentially creating adverse effects on the flying characteristics of the clock head 186. The stress induced by the shrinkage of the bonding agent is illustrated in FIG. 5, where it can be seen that the stress at the center of the bond is zero, or minimal, and increases in a linear fashion as the distance from the center increases, as represented by force vector arrows 194, with the greatest stress induced at the perimeter of the clock head 186. The angle of increase in the stress force, as illustrated by dashed line 196, is dependent on the nature of the bonding agent, e.g., the amount of shrinkage in the bonding agent as it cures, and other factors known to those of skill in the art.

It will be appreciated by those of skill in the art that forces inducing stress in the slider body of a head can lead to distortion of the head, adversely affecting its flying characteristics, and, if the distortion is severe enough, potentially damaging contact between the head and disc can occur. It is also evident that, as the physical size of the head, especially the thickness, is reduced, the distorting effects on the head are exacerbated.

Table 1, below, shows the physical dimensions of various standard head sliders, and also shows the relative stiffness of a spacer.

TABLE 1

| Slider Size | Width | Length | Thickness | Relative Stiffness |
|---|---|---|---|---|
| 70% | 0.088" | 0.112" | 0.024" | 1 |
| 50% | 0.063" | 0.080" | 0.017" | 68% |
| 30% | 0.039" | 0.049" | 0.012" | 64% |
| Spacer (50%) | 0.030" | 0.040" | 0.043" | 600% |

In Table 1, the 70% slider has been assigned the reference "stiffness" value of "1", and all other stiffnesses in the table are referenced as percentages of this unitary value. The width and length of the spacer are given as 0.030" and 0.040", respectively, and are for a spacer made in accordance with the present invention intended for use with a clock head based on a 50% slider. A comparison between the spacer dimensions given in the table and the dimensions given for a 50% slider reveals that the length and width of the spacer at the bonding interface are approximately one-half the length and width of the 50% slider.

It is apparent that the stiffness of the slider drops significantly when transitioning from the 70% slider to the 50% slider, and drops again, though to a lesser extent when the size drops from the 50% slider to the 30% slider. The smaller relative drop in stiffness is due to the fact that the actual thickness reduction going from the 50% slider to the 30% slider is less than was the case in going from the 70% slider to the 50% slider. What is most significant in Table 1 is the fact that the relative stiffness of the spacer is 600% of even the 70% slider, and this relative stiffness would be even greater in relationship to the "more flexible" 50% and 30% sliders. This means that distorting force exerted between the two components—as when the slider is adhesively bonded to a spacer—will have a significant distortion effect on the slider, while leaving the spacer relatively unaffected.

It will be readily apparent to one of skill in the art that distortion of the slider body of a head assembly should be avoided to ensure proper flying characteristics of the head assembly.

Figure 6:
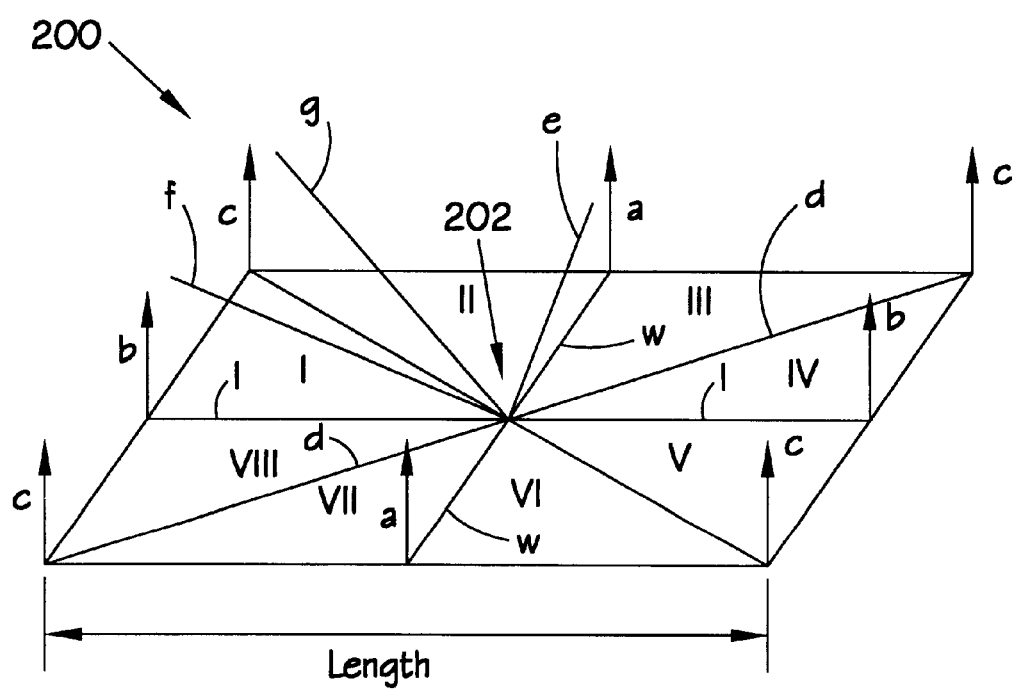
FIG. 6 is a force vector diagram, useful for a more detailed discussion of the stresses induced in a slider by adhesive bonding to a spacer.

While FIG. 5 represents stresses induced in a single plane, the actual stresses induced in a clock head as a result of bonding to a spacer present a three-dimensional situation, more accurately reflected in FIG. 6.

FIG. 6 is a force vector diagram, representing the forces generated at the area of adhesive bonding between a clock head and a spacer, such as those of FIG. 5. The bonding area 200 is rectangular in shape, and has a length greater than its width, as shown.

The total bonding area 200 is divided by a longitudinal centerline (not designated) and a lateral centerline (also not designated) to form two line portions representative of half-lengths, designated l, and two half-widths, designated w. Similarly, the bonding area 200 is divided by diagonals connecting the outermost corners, forming, from the center 202 of the bonding area 200, four half-diagonal line portions, designated d. The line portions just described serve to divide the bonding area into eight segments, arbitrarily numbered I through VIII.

As previously described with regard to FIG. 5, the stress forces developed by shrinkage as the bonding agent cures increase in a linear manner from substantially zero at the center 202 of the bonding area 200, with the rate of increase dependent on the properties of the bonding agent. Thus, as can be seen in the figure, the stress inducing force increases across the half-widths w, along the line designated "e" from the center 202 of the bonding area 200 to a maximum force of "a" at points midway along the lateral edges of the bonding area. Similarly, along the half-lengths, l, the force increases at the same slope along line "f" from the center 202 to mid points of the width ends of the bonding area 200. Since the half-lengths l are longer than the half-widths w, the force exerted at the longitudinal ends, designated with vector arrows as "b", is greater than the force "a" at the sides of the bonding area 200. Finally, along the still longer half diagonals d, the force increases at the same slope along lines designated "g" to the greatest localized force exerted in the bonding area 200, as represented by vector arrows "c" at the corners of the bonding area 200.

One of skill in the art will appreciate that FIG. 6 is still representative of only forces exerted along the longitudinal and lateral centerlines and diagonals of the bonding area 200, and that the total force exerted on the slider body of the clock head can actually be represented by polygonal solid forms bounded by the planar elements shown in FIG. 6, as will be further discussed below. The force lines of FIG. 6 can be used to envision two groups of geometric solids, with four spatially identical forms in each group, the total volume of which will be proportional to the stress-inducing force exerted on the slider.

Figure 7:
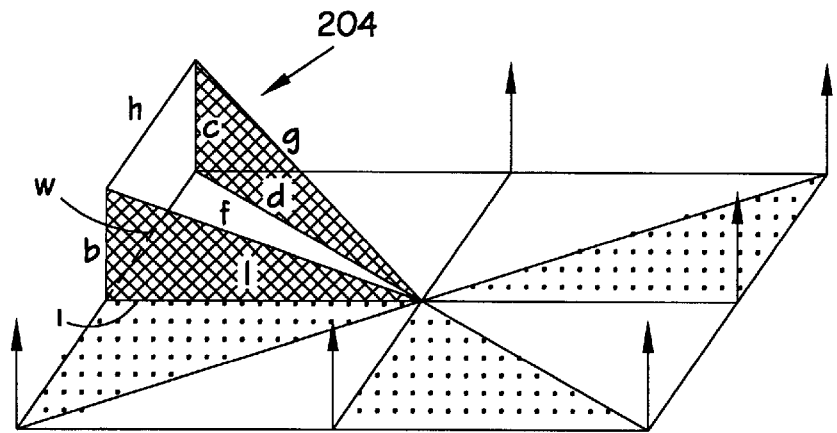
FIG. 7 is a force vector diagram, similar to that of FIG. 6, useful for a detailed analysis of the stresses induced in a slider by adhesive bonding to a spacer.

FIG. 7 defines one of the solid forms that make up the first group, identified as 204 in the figure. Again, the geometric form 204 is representative of the total of force exerted in the bonding area segment I, as previously identified in FIG. 6. The form 204 is thus made up of: the triangle forming segment I, bounded by lines l, w and d; a second triangle having sides l, b and f; a third triangle with sides d, c and g; a quadrilateral, with sides b, w, c and line h (connecting the tops of vectors b and c); and a fourth triangle with sides f, g and h.

Figure 8:
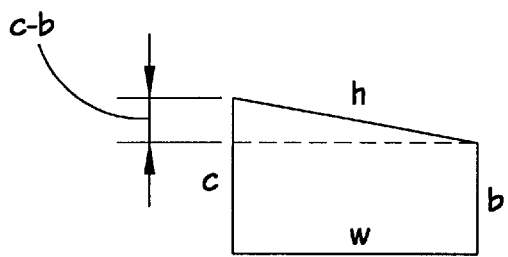
FIG. 8 is a geometric figure useful in the detailed stress analysis facilitated by FIG. 7.

The length of h can be determined by simple trigonometric analysis, as shown in FIG. 8, which shows the quadrilateral b, w, c, h, which can be thought of as consisting of a rectangle b×w, and a right triangle with a base of w and a height of c−b. Thus the length of h is defined as the square root of $(w^2+(c-b)^2)$.

Returning to FIG. 7, it will be apparent that the volume of shape 204 will be replicated in the shaded segments of the figure, or those segments designated as IV, V and VIII in FIG. 6.

Figure 9:
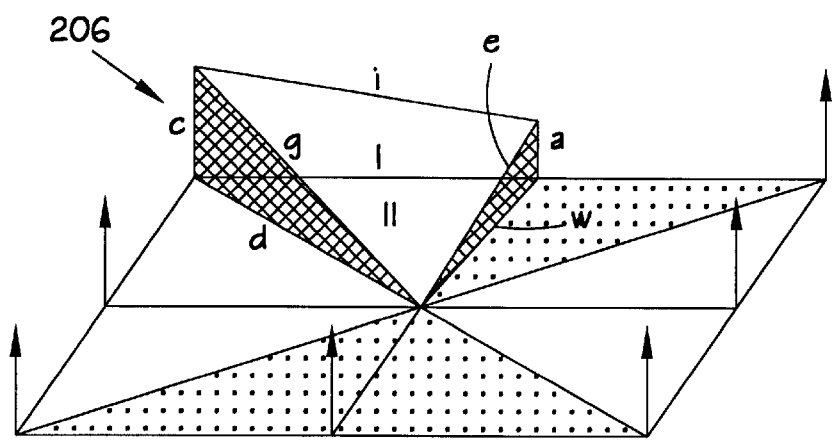
FIG. 9 is a force vector diagram, similar to those of FIGS. 6 and 7, useful for a detailed analysis of the stresses induced in a slider by adhesive bonding to a spacer.

FIG. 9 shows the solid form 206 representing total force exerted on segment II of the bonding area. This form 206 is bounded by: the triangle of segment II, having sides d, l and w; a second triangle with sides d, c and g; a third triangle with sides w, a and e; the quadralateral with sides a, l, c and i (connecting the tops of vectors a and c); and a fourth triangle with sides g, i and e. Once again, the length of i can be determined by simple trigonometric analysis, as shown in FIG. 10.

Figure 10:
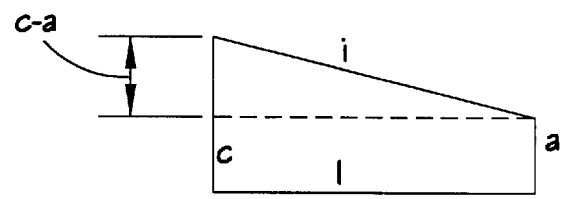
FIG. 10 is a geometric figure useful in the detailed stress analysis facilitated by FIG. 9.

FIG. 10 shows the quadrilateral a, l, c, i, and shows that the quadrilateral can be thought of as consisting of a rectangle l×a and a right triangle having a base of l and a height of c−a. Therefore, the length of i is the square root of $(l^2+(c-a)^2)$.

Once again, it will be apparent that the volume of form 206 will be replicated in the shaded segments of FIG. 9, or segments III, VI and VII in FIG. 6.

Armed with this analysis, it is now possible to apply actual dimensions to calculate the volumes of geometric forms 204 and 206, and thus the forces applied to the slider by various sizes of bonding area. If the slope of the increase in force as distance from the center is normalized, for ease of calculation, to a value of 1, then the triangles l-b-f in FIG. 7, d-c-g in FIGS. 7 and 9 and w-a-e in FIG. 9 all become 45° triangles, useful for calculating relative distorting forces for differing sizes of bonding area. The force applied in segments I, IV, V and VIII is proportional to the integral of the area below the triangle f-g-h, while the force applied in segments II, III, VI and VII is proportional to the integral of the area below triangle g-i-e. With the normalized force increase rate of 1, the base and height of triangle c-d-g—common to both solid forms 204 in FIG. 7 and 206 in FIG. 9—are equal, as are the bases and heights of triangles l-b-f and w-a-e, and the solution for each solid form 204, 206 becomes $\frac{1}{6} B^3 - \frac{1}{6} b^3$, where B and b are bases equal to d and either w or l, respectively, dependent upon whether the calculation is being performed for the forms 206, or 204, respectively.

Applying this to the dimensions of the entire top surface of a 50% slider, where:

w=a=~32 mil;

l=b=~40 mil;

and d=c=~51 mil, provides:

$\frac{1}{6} \times 51^3 - \frac{1}{6} \times 32^3 = 22108.5 - 5461.3333 \ldots = 16,647.1666 \ldots \times 4 = 66,588.6666 \ldots$ (four segments)

$\frac{1}{6} \times 51^3 - \frac{1}{6} \times 40^3 = 22,108.5 - 10,666.666 \ldots = 11,441.83333 \ldots \times 4 = 45,767.3333 \ldots$ (four segments)

for a total volume of 66,588.666 . . . +45,767.333 . . . , or approximately 112,356 mil$^3$.

By contrast, if the bonding area is only 40 mil by 30 mil, as in the example shown in Table 1, or substantially one-half the overall length and width of the 50% slider, the calculation works out as follows:

w=a=15 mil;

l=b=20 mil;

and d=c=25 mil, therefore:

$\frac{1}{6} \times 25^3 - \frac{1}{6} \times 15^3 = 2604.16666 \ldots -562.5 = 2041.66666 \ldots \times 4 = 8166.6666 \ldots$ (four segments)

$\frac{1}{6} \times 25^3 - \frac{1}{6} \times 20^3 = 2604.1666 \ldots -1333.3333 \ldots = 1270.8333 \ldots \times 4 = 5083.3333 \ldots$ (four segments)

for a total volume of 8166.666 . . . +5083.333 . . . , or approximately 13,250 mil$^3$.

The ratio of the total distorting force for a bonding area equal to that of a 50% slider vs. that of bonding area with length and width substantially one-half of the slider dimensions is thus 112,356:13,250, or approximately 8.5:1. While this ratio applies specifically to those cases where the slope of exerted force rises at the normalized example slope of 1 for the calculations noted above, other slopes of force increase with distance from the bonding area center will yield differing, but still advantageous, ratios, with the particular ratio being a function of the characteristics of the bonding agent, as noted above.

In accordance with one aspect of the present invention, the bonding surface of the spacer is selected such that its length and width are substantially one half the length and width, respectively, of the clock head slider body. Thus, if a 50% slider is used to produce the clock head, the spacer will be bonded to the clock head slider over an area substantially 40 mils by 30 mils. Similarly, if the clock head is based on a 30% slider, the size of the bonding area will be proportionally reduced. This aspect of the invention is thus scalable with future expected reduction in head slider form factors.

It is also apparent that the strength of the bond between the clock head and the spacer will be inversely proportional to the size of the bond area. Testing has revealed that the necessary optimization between bond strength and slider distortion is also achieved when the length and width of the bond area are substantially half of the slider length and width, respectively. Thus this aspect of the invention not only reduces distortion of the clock head slider, but also provides adequate bond strength.

Other aspects of the present invention are related to processing considerations.

Firstly, the face of the spacer to be bonded to the clock head must have a very high surface quality—that is, extremely flat and smooth—in order to ensure adequate bond strength, as well as even distribution of the distortion-inducing stresses brought about by the bonding of the components together. Spacers are typically sawn from blocks of ceramic material, and the sawing operation is likely to leave burrs and uneven edges on the spacer. Therefore, the present invention envisions that the surface of the spacer to be bonded to the clock head is lapped after sawing, to ensure high surface quality.

Prior art spacers, and the manufacturing processes associated with them, required that the spacers be sawn and then individually lapped, a time-consuming, tedious, and costly process. The present invention, however, readily lends itself to production by a batch process, as will be explained in more detail below.

Secondly, as can be seen from an examination of the prior art of FIGS. 4 and 5, the prior art spacer is substantially cubical in shape. Thus, even if the single surface intended for bonding to the clock head were lapped to provide adequate surface quality, it is problematic in a volume manufacturing environment to readily identify the prepared surface, and thus ensure proper contact is made between the spacer and the clock head. The present invention includes an identifying feature which visually and obviously identifies the face of the spacer to be bonded to the clock head. Once again, formation of this identifying feature is inherent in the presently preferred process used to produce the spacer of the clock head assembly of the present invention.

FIGS. 11 through 15 illustrate various stages in the manufacture of a spacer which forms a portion of the clock head assembly of the present invention.

Figure 11:
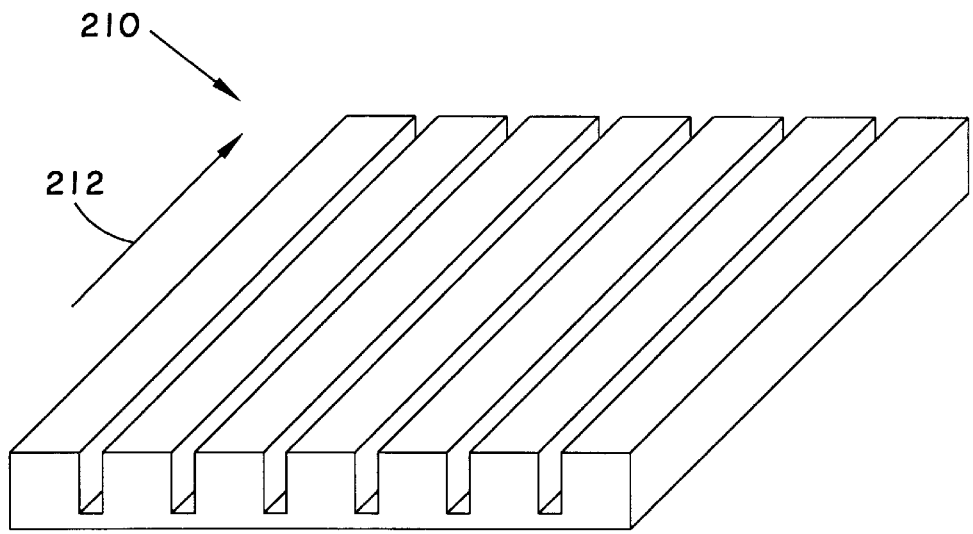
FIGS. 11 through 15 are simplified figures illustrating various steps in a batch process to which a spacer component of the clock head assembly of the present invention particularly lends itself.

Beginning as shown in FIG. 11, a block of ceramic material 210 is partially sawn in parallel with a first of its orthogonal axes, 212, to define one dimension of the spacer—in the isometric view of FIG. 11, the width of the contact surface to be bonded to the clock head.

Figure 12:
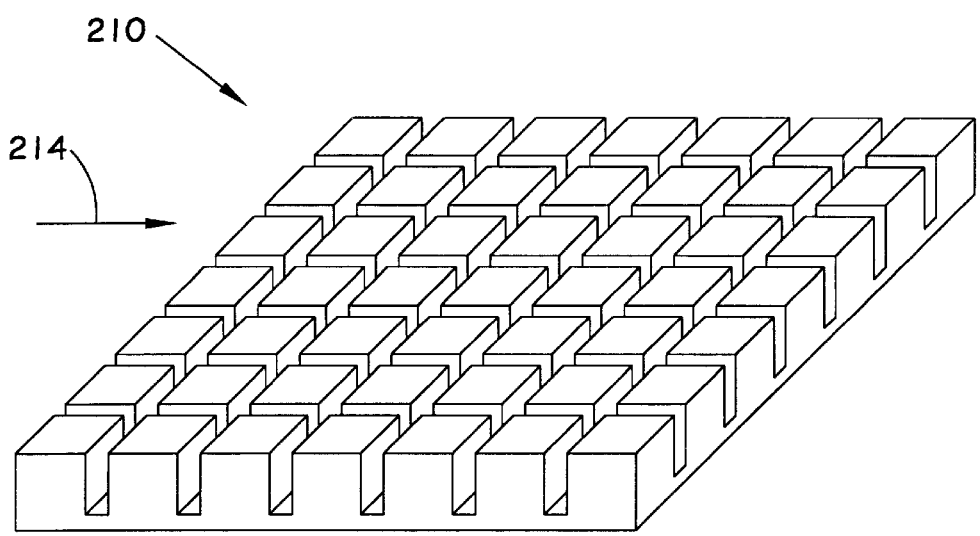

Then, as shown in FIG. 12, the ceramic block 210 is partially sawn in a second axis 214 to define a second principal dimension—in the example shown, the length of the spacer bonding surface with the clock head. Thus, the major dimensions of the spacers are defined, but the individual spacers are still bound together by webs formed by the unsawn portions, and the spacers can be processed as a batch in subsequent steps of manufacture.

Figure 13:
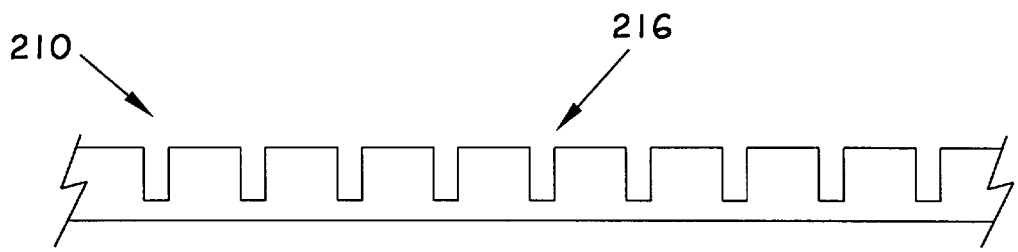

As shown in the elevation view of FIG. 13, the sawing processes of FIGS. 11 and 12 leave the edges of the contact surfaces with burrs and irregularities, as indicated at 216 in FIG. 13. Such burrs, if not removed, would lead to undesirable variation in not only the relative orientation between the spacers and the clock head, but reduction of the optimum bonding strength between these components.

Figure 14:
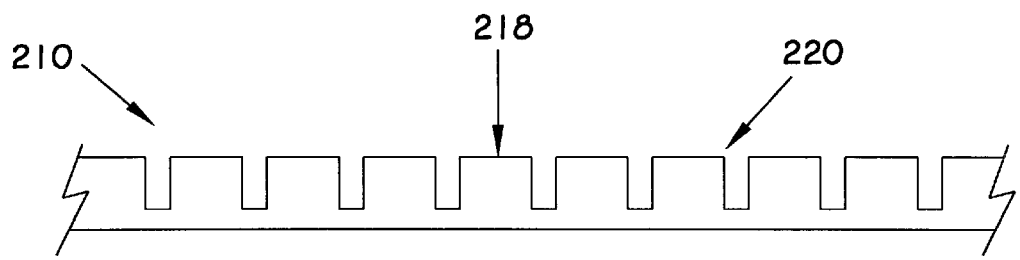

FIG. 14 shows the result of the next envisioned process step, which is the lapping of the bonding surfaces 218. This lapping operation can be performed on the entire array of spacers as a batch, since they are still attached as parts of the original ceramic block 210. The lapping process serves not only to ensure the desired high surface quality at the bonding surfaces 218, but also to remove the burrs (216 in FIG. 13), and leave the edges 220 of the bonding surfaces 218 with a slight bevel.

Figure 15:
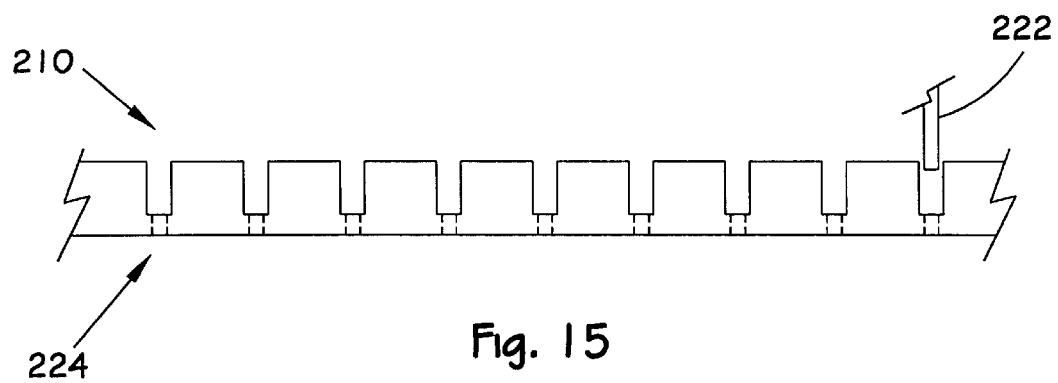

Finally, as shown in FIG. 15, the individual spacers are separated from the ceramic block 210 by a parting tool 222. As can be seen in the figure, the parting tool 222 is envisioned to be narrower than the tool (not shown) used to make the cuts of FIGS. 11 and 12. Using a narrower parting tool 222 allows the parting tool to saw through the connecting web elements of the ceramic block 210, without contacting and damaging the previously lapped bonding surfaces (218 in FIG. 14), and provides another advantage, as well.

As shown by dashed lines at 224 in FIG. 15, the narrow parting tool 222 will leave a rim around the spacer at the surface opposite the bonding surface 218 intended for bonding to the clock head, and this rim will act as a convenient visual aid during bonding to the clock head to identify the lapped surface which should be bonded to the clock head, i.e., the surface opposite the rim.

Figure 16:
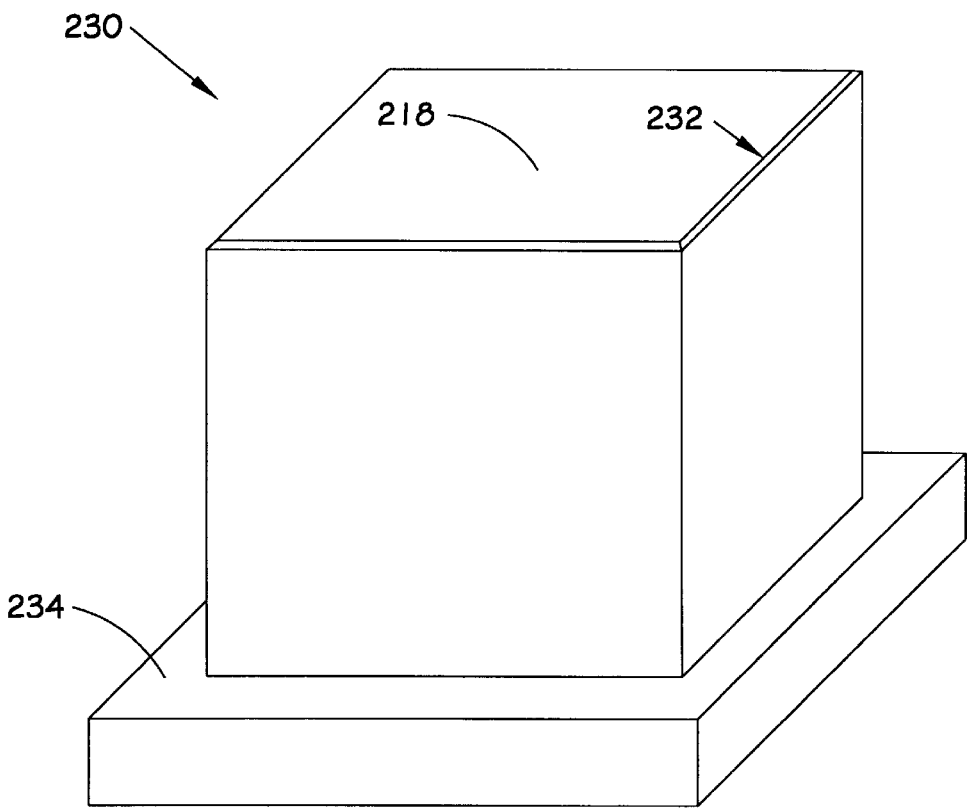
FIG. 16 is a detail isometric view of a spacer for a clock head assembly made in accordance with the present invention.

FIG. 16 is an extreme closeup view of a single spacer 230 made in accordance with the present invention. In the figure, the precisely lapped bonding surface 218 can be seen opposite the identifying rim 234. Also shown are the small bevels 232 produced at the edges of the bonding surface 218 by the lapping process.

While FIG. 16 shows details of the features of the spacer 230, the size of the spacer 230 relative to an associated head assembly is not apparent in the figure.

Figure 17:
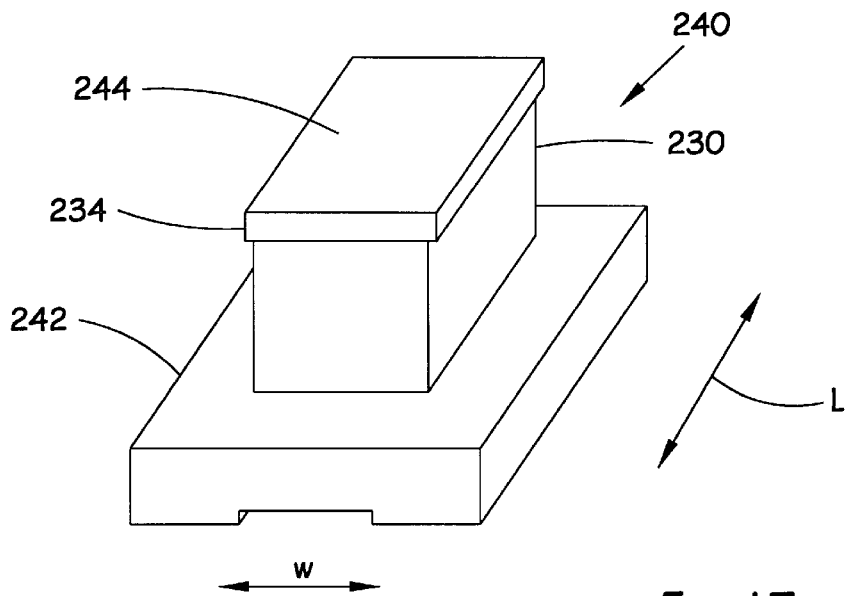
FIG. 17 is an isometric view of a slider/spacer assembly made in accordance with the present invention.

FIG. 17 shows a clock head/spacer assembly 240, with the length and width axes used in subsequent discussion identified by lines labeled L and W, respectively.

As can be seen in FIG. 17, the bonding surface (218 in FIGS. 15 and 16) is mated to the upper surface of the head assembly 242. Once again, proper orientation of the spacer 230 relative to the head assembly 242 is simplified by the presence of the rim 234, which must be placed opposite the head assembly 242.

FIG. 17 also shows that the length and width of the spacer 230 where it is bonded to the head assembly 242 are substantially half the overall length and width, respectively, of the head assembly 242, thus minimizing the stresses induced in the head assembly 242 by the bonding process, while still maintaining an adequate bonding strength, as previously discussed.

Finally, FIG. 17 illustrates yet another aspect of the present invention. As will be evident from the description of the presently preferred manufacturing process discussed above, the relative size of the surrounding rim 234 will be determined by the tools used to saw and separate the individual spacers 230. This becomes significant when it is recalled that the surface of the spacer 230 adjacent the rim 234 is the surface used to attach the entire head/spacer assembly 240 to the gimbal portion of the head suspension, and is thus the gimbal bonding surface 244. Varying the size of the saw elements and parting tools used to produce the spacer 230 also allows the size of the gimbal bonding surface 244 to be optimized to provide the desired attachment strength, without having any related effect on the size of the bond between the spacer 230 and the head assembly 242, a benefit clearly not available to the substantially cubiform prior art spacers of FIGS. 4 and 5, in which the gimbal bonding surface is the same size and dimensions as the head bonding surface.

Thus, the spacer 230 which is a part of the present invention allows separate optimization of the size of the bonding areas between the spacer and the head assembly and between the spacer and the gimbal portion of the head suspension which mounts and supports the spacer/head assembly 240.

In summary, the present invention provides a clock head assembly which allows for a selectable size for the bond area between a spacer and a head assembly, to prevent excessive stress induced by bonding agent shrinkage from causing distortion of the head assembly. The spacer which forms a part of the invention lends itself readily to batch production techniques, which results in reduced costs. The spacer of the preferred embodiment includes a surrounding rim adjacent the spacer surface opposite the head bonding surface, which provides simple visual guidance for orienting the proper surface of the spacer to the head assembly during the bonding process, and which also provides flexibility in selecting the size of the bonding area between the spacer and a gimbal portion of an associated head suspension.

From the foregoing, it is apparent that the present invention is particularly well suited to provide the benefits set forth hereinabove as well as others inherent therein. While particular embodiments of the invention have been described herein, modifications to the embodiments that fall within the envisioned scope of the invention may suggest themselves to one of skill in the art who reads this disclosure. Therefore, the scope of the invention should be considered to be limited only by the following claims.

What is claimed is:

1. A clock head assembly for writing servo timing marks to a surface of a disc, comprising:
    a head suspension, including a gimbal portion;
    a servo clock head assembly, including a transducer for writing the servo timing marks;
    the servo clock head assembly having a first length and first width; and
    a spacer disposed between the servo clock head assembly and the gimbal portion of the head suspension;
    the spacer comprising:
        a head bonding surface, adhesively bonded to the servo clock head assembly,
        the head bonding surface having a second length and a second width, each less than the first length and first width, respectively;
        a gimbal bonding surface opposite the head bonding surface; and
        a surrounding rim portion defining dimensions of the gimbal bonding surface, whereby the dimensions of the gimbal bonding surface are selectable independently from the second length and second width of the head bonding surface.

2. The clock head assembly of claim 1 wherein the second length and second width are each substantially one-half of the first length and first width, respectively.

3. The clock head assembly of claim 1 wherein the surrounding rim portion defines dimensions larger than the second length and second width.

4. A clock head assembly for writing servo timing marks to a surface of a disc, comprising:
    a head suspension, including a gimbal portion;
    a servo clock head assembly including a transducer for writing the servo timing marks and a top surface; and
    a spacer disposed between the servo clock head assembly and the gimbal portion, and adhesively bonded at a first surface thereof to the top surface of the servo clock head assembly and at the second opposing surface thereof to the gimbal portion;
    the spacer further comprising first means for reducing stresses in the servo clock head assembly when the spacer is adhesively bonded to the servo clock head assembly, second means for visually distinguishing between the first and second surface of the spacer, and third means for allowing dimensions of the second surface of the spacer to be selected independently from dimensions of the first surface of the spacer.

5. A clock head assembly for writing timing marks to a surface of a disc, comprising:
    a head suspension, including a gimbal portion;
    a head assembly, including a transducer for writing the timing marks;
    the head assembly having a first length and first width; and
    a spacer disposed between the head assembly and the gimbal portion of the head suspension;
    the spacer comprising:
        a head bonding surface, adhesively bonded to the head assembly, the head bonding surface having a second length and a second width, each substantially one-half of the first length and first width, respectively;
        a gimbal bonding surface opposite the head bonding surface; and
        a surrounding rim portion defining dimensions of the gimbal bonding surface;
    whereby the dimensions of the gimbal bonding surface are selectable independently from the length and width of the head bonding surface.

* * * * *

UNITED STATES PATENT AND TRADEMARK OFFICE
CERTIFICATE OF CORRECTION

PATENT NO. : 6,545,844 B1
DATED : April 8, 2003
INVENTOR(S) : Schaenzer et al

It is certified that error appears in the above-identified patent and that said Letters Patent is hereby corrected as shown below:

Column 10,
Lines 44-45, "$1/6 x 51^3 - 1/6 x 32^3 = 22108.5 - 5461.333... = 16,647.1666...x4 = 66,588.6666...$ (four segments)" should be -- $1/6 \times 51^3 - 1/6 \times 32^3 = 22108.5 - 5461.333... = 16,647.1666...x4 = 66,588.6666...$ (four segments) --

Signed and Sealed this

Third Day of August, 2004

JON W. DUDAS
*Acting Director of the United States Patent and Trademark Office*